July 16, 1929.  G. T. HALL  1,721,445
COMBINATION STOVE
Filed March 21, 1927  2 Sheets-Sheet 1
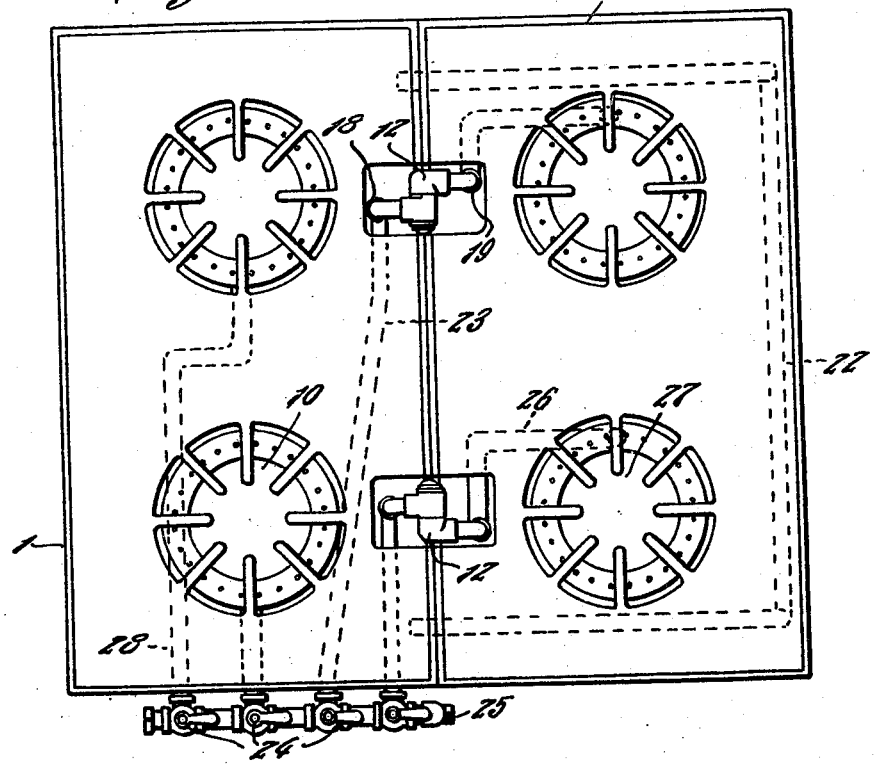
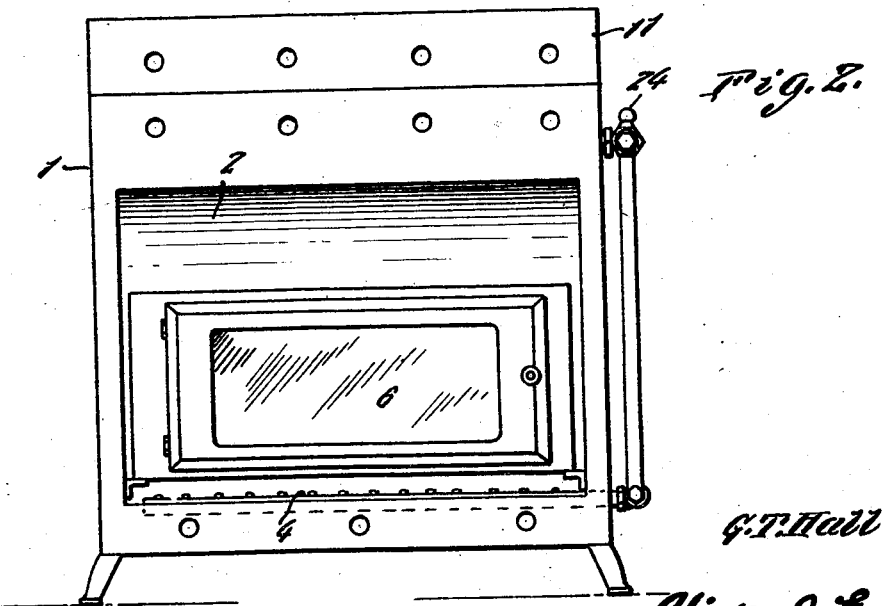
G. T. Hall
INVENTOR
BY Victor J. Evans
ATTORNEY July 16, 1929.　　　　　G. T. HALL　　　　　1,721,445
COMBINATION STOVE
Filed March 21, 1927　　　2 Sheets-Sheet 2
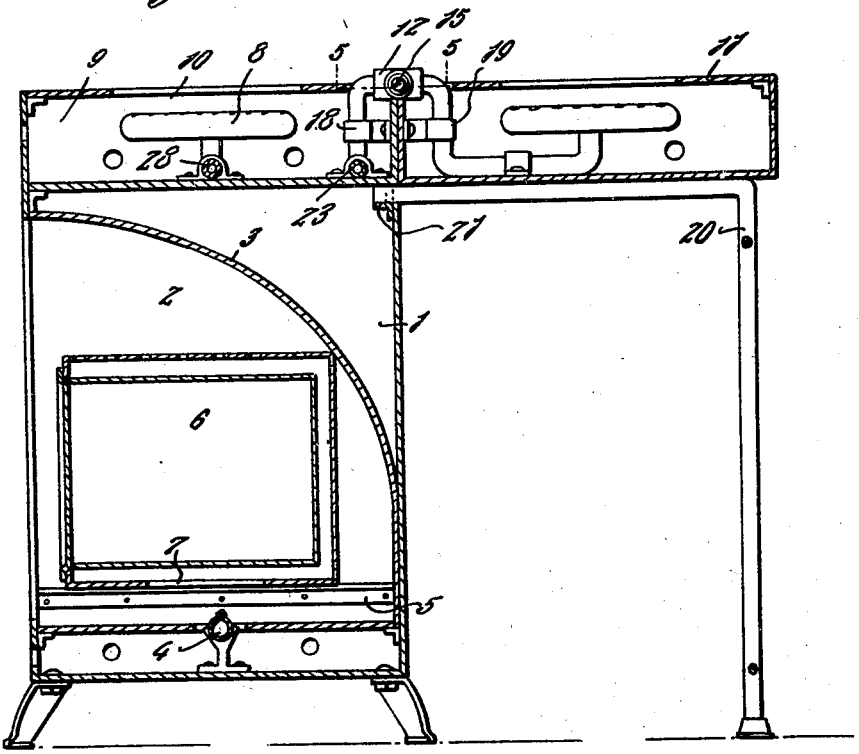
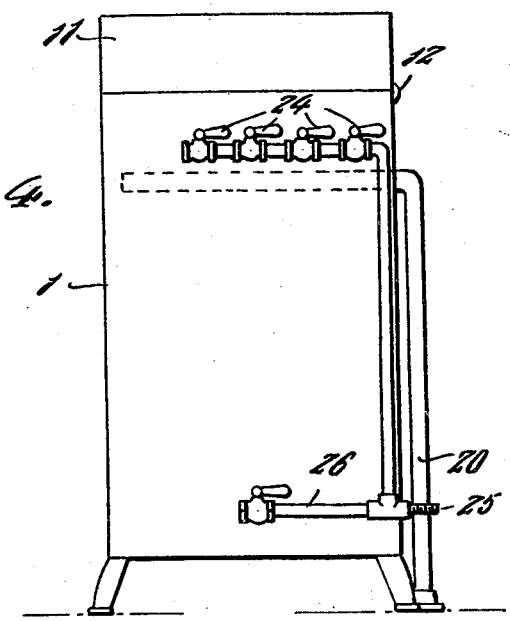
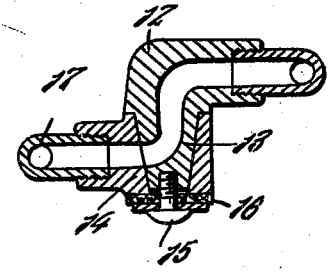
G. T. Hall — INVENTOR
BY Victor J. Evans
ATTORNEY Patented July 16, 1929.

1,721,445

UNITED STATES PATENT OFFICE.

GEORGE TAYLOR HALL, OF WEATHERFORD, TEXAS.

COMBINATION STOVE.

Application filed March 21, 1927. Serial No. 177,122.

This invention relates to a gas stove, the general object of the invention being to provide means whereby the stove can be used for both cooking and heating purposes, with means for reducing the size of the stove when it is to be used for heating purposes or when it is to be stored.

A further object of the invention is to provide a detachable oven which is to be used with the heating part of the stove when baking is to be done.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the stove with the hinge part in open position.

Figure 2 is a front view with the hinge part in closed position.

Figure 3 is a sectional view with the hinge part in open position.

Figure 4 is a side view with the stove in closed position.

Figure 5 is a section on line 5—5 of Figure 3.

In these views, 1 indicates the body of the stove which is formed with a heating chamber 2, the rear wall of which is of arc shape, as shown at 3, and the front of which is open so that the heat waves will be directed from the stove by the arc shaped rear wall. The burners for the heating chambers are shown at 4 and guideways 5 are placed on the side walls of the heating chamber to support a detachable oven 6 which is made in the usual manner and which, when in position, will have its bottom opening 7 above the burners 4 so that the heat will circulate between the two parts of the oven. As will be seen, this oven can be removed and then this part of the stove will be used as a simple gas heater.

A pair of burners 8 is arranged at the top of the stove and may be placed in the chamber 9 formed at the top of the stove, the openings above the burners being provided with the usual grids 10. A casing-like member 11 is hinged to the top of the stove preferably at the rear, each hinge being composed of an elbow 12 having a tapered end 13 which engages a tapered socket in a coupling 14, a screw 15 and washers 16 holding the parts together and a bent pipe 17 is connected to each of the members 12 and 14 and one of these pipes 17 is connected to the rear wall of the chamber 9 by the bracket 18 and a similar bracket 19 connects the other pipe with the casing 11. Thus the casing 11 can be placed on top of the chamber 9 or it can be moved to open position at the rear of the stove where it will be parallel to the chamber 9. In this position the casing will be supported by inverted tubular L-shaped legs 20 which have their horizontal portions passing through openings reinforced as at 21 and being formed in the rear wall of the stove, the legs being connected together by the cross pieces 22. When not in use, the legs are pushed inwardly until their vertical portions engage the rear part of the stove. The pipes 17 in the casing 9 are connected by pipes 23 with cocks 24 which are mounted in the gas line 25 at one side of the stove while the pipes 17 in the casing 11 are connected by pipes 26 with burners 27 in the casing 11. Pipes 28 connect the burners 8 with the line 25 and a branch line 26 connects the gas line with the burners 4.

From the foregoing, it will be seen that when the stove is in storage or is located in a place where room is limited, the casing 11 can be folded over upon the top of the stove so that the stove will occupy the minimum amount of space. When the top burners are to be used, however, the legs 20 are pulled outwardly and then the casing 11 is moved to open position so that the four burners will be ready for use, when desired. The stove can be used as a heater by lighting the burners 4 and when the oven is to be used, it is set on the guides 5 in the heating chamber, as shown in Figures 2 and 3. The hinges for the casing 11 form conduits for the gas flowing to the burners in said casing.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A stove of the character described comprising a body including a rear wall, burners included in said stove, a casing hingedly secured with respect to said body and foldable to be arranged in closed position over the top of the stove, said casing being disposed parallel with the top when in open position, inverted tubular L-shape legs having their horizontal portions mounted for slidable movement through openings formed in the rear wall of said body and adapted to support the casing in open position, reinforcing means for said openings, burners arranged in said casing, and means for supplying fuel to the burners.

In testimony whereof I affix my signature.

GEORGE TAYLOR HALL.